US012005560B2

(12) United States Patent
Sitter et al.

(10) Patent No.: US 12,005,560 B2
(45) Date of Patent: Jun. 11, 2024

(54) OSCILLATING POWER TOOL WITH ADJUSTABLE ANGULAR AMPLITUDE OF OSCILLATION

(71) Applicant: MILWAUKEE ELECTRIC TOOL CORPORATION, Brookfield, WI (US)

(72) Inventors: James C. Sitter, Milwaukee, WI (US); David A. Bierdeman, New Berlin, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 660 days.

(21) Appl. No.: 17/058,836

(22) PCT Filed: Sep. 4, 2020

(86) PCT No.: PCT/US2020/049520
§ 371 (c)(1),
(2) Date: Nov. 25, 2020

(87) PCT Pub. No.: WO2021/046431
PCT Pub. Date: Mar. 11, 2021

(65) Prior Publication Data
US 2022/0297280 A1 Sep. 22, 2022

Related U.S. Application Data

(60) Provisional application No. 62/895,860, filed on Sep. 4, 2019.

(51) Int. Cl.
*B25F 5/02* (2006.01)
*B23D 51/16* (2006.01)
*B25F 3/00* (2006.01)

(52) U.S. Cl.
CPC ............... *B25F 5/02* (2013.01); *B23D 51/16* (2013.01); *B25F 3/00* (2013.01)

(58) Field of Classification Search
CPC ..................................................... B24B 23/04
See application file for complete search history.

(56) References Cited

U.S. PATENT DOCUMENTS

| 4,989,488 | A | 2/1991 | Pötzsch |
| 5,123,216 | A | 6/1992 | Kloss et al. |

(Continued)

FOREIGN PATENT DOCUMENTS

| CN | 102441873 A | 5/2012 |
| CN | 102441874 A | 5/2012 |

(Continued)

OTHER PUBLICATIONS

International Search Report and Written Opinion for Application No. PCT/US2020/049520 dated Dec. 8, 2020 (10 pages).

(Continued)

*Primary Examiner* — Daniel Jeremy Leeds
(74) *Attorney, Agent, or Firm* — Michael Best & Friedrich LLP (57) ABSTRACT

An oscillating power tool including a housing, a motor including a drive shaft rotatable about a motor axis, an output spindle configured to be driven by the motor and journaled for oscillating rotation about an oscillation axis, and a drive mechanism. The drive mechanism is configured to convert rotation of the drive shaft into oscillating rotation of the output spindle about the oscillation axis and includes an eccentric member and a forked member. Oscillating rotation of the forked member has an angular amplitude about the oscillation axis. The eccentric member is movable with respect to the forked member to change the angular amplitude of oscillating rotation of the forked member. An amplitude adjustment actuator is configured to move the eccentric member to change the angular amplitude of oscillating rotation of the forked member. The amplitude adjust- (Continued)

ment actuator defines a receptacle. At least a portion of the forked member is disposed in the receptacle.

18 Claims, 7 Drawing Sheets

(56) References Cited

U.S. PATENT DOCUMENTS

| | | | |
|---|---|---|---|
| 5,437,571 | A | 8/1995 | Everts et al. |
| 5,441,450 | A | 8/1995 | Fein et al. |
| 5,637,034 | A | 6/1997 | Everts et al. |
| 6,360,639 | B1 | 3/2002 | Gerber |
| 7,108,077 | B2 | 9/2006 | Zaiser |
| 8,757,285 | B2 | 6/2014 | Weber et al. |
| 8,881,409 | B2 | 11/2014 | Haman |
| 10,213,852 | B2 | 2/2019 | Qian et al. |
| 2002/0170186 | A1 | 11/2002 | Sakaguchi |
| 2005/0126803 | A1* | 6/2005 | Zaiser .................. B24B 23/04 173/217 |
| 2005/0199407 | A1 | 9/2005 | Hermann |
| 2008/0027449 | A1 | 1/2008 | Gundlapalli et al. |
| 2011/0011605 | A1 | 1/2011 | Kildevaeld |
| 2011/0209888 | A1 | 9/2011 | Elsworthy |
| 2014/0068952 | A1 | 3/2014 | Soreo et al. |
| 2015/0034353 | A1* | 2/2015 | Huo ...................... H02K 7/075 173/217 |
| 2016/0271711 | A1 | 9/2016 | Qian et al. |
| 2018/0335118 | A1* | 11/2018 | Gu ........................... B25F 5/001 |
| 2019/0030616 | A1 | 1/2019 | Hess et al. |
| 2019/0120347 | A1 | 4/2019 | Bek et al. |
| 2019/0151969 | A1 | 5/2019 | Qian et al. |

FOREIGN PATENT DOCUMENTS

| | | |
|---|---|---|
| CN | 102441875 A | 5/2012 |
| CN | 103302641 A | 9/2013 |
| CN | 103465229 A | 12/2013 |
| CN | 103350414 A | 8/2014 |
| CN | 104669218 A | 6/2015 |
| DE | 202014009989 U1 | 1/2015 |
| EP | 2823938 A1 | 1/2015 |
| WO | 2012041211 A1 | 4/2012 |
| WO | 2016082768 A1 | 6/2016 |
| WO | 2018129656 A1 | 7/2018 |

OTHER PUBLICATIONS

International Search Report and Written Opinion for Application No. PCT/CN2017/070751 dated Sep. 27, 2017, (12 pages).
European Patent Office Extended Search Report for Application No. 17891641.7 dated Sep. 28, 2020 (9 pages).
Canadian Patent Office Action for Related Application No. 3,049,815 dated Aug. 15, 2019 (4 pages).

* cited by examiner

OSCILLATING POWER TOOL WITH ADJUSTABLE ANGULAR AMPLITUDE OF OSCILLATION

CROSS-REFERENCE TO RELATED APPLICATION

This application is a national phase filing under 35 U.S.C. § 371 of International Application No. PCT/US2020/049520, filed Sep. 4, 2020, which claims priority to U.S. Provisional Patent Application No. 62/895,860 filed on Sep. 4, 2019, the entire contents of which are incorporated herein by reference.

BACKGROUND

The present disclosure relates to power tools, and more specifically, the present invention relates to oscillating power tools. Power tools utilize the rotation of a motor to provide useful oscillating rotational output for operations such as cutting, sanding, grinding, etc.

SUMMARY

In one aspect, the disclosure provides an oscillating power tool including a housing, and a motor disposed generally within the housing, the motor including a drive shaft rotatable about a motor axis. The oscillating power tool also includes an output spindle configured to be driven by the motor and journaled for oscillating rotation about an oscillation axis. The oscillating power tool also includes a drive mechanism configured to convert rotation of the drive shaft into oscillating rotation of the output spindle about the oscillation axis, the drive mechanism including an eccentric member configured to rotate off center about the motor axis, and a forked member operatively coupled to the eccentric member and configured for oscillating rotation about the oscillation axis in response to rotation of the eccentric member. Oscillating rotation of the forked member has an angular amplitude about the oscillation axis. The eccentric member is movable with respect to the forked member to change the angular amplitude of oscillating rotation of the forked member. The eccentric member includes a front surface and a rear surface opposite the front surface. The front surface is closer to the output spindle than the rear surface, and the rear surface is closer to the motor than the front surface. A set of three orthogonal reference planes intersect each other at a geometric center of the eccentric member, the set of three orthogonal reference planes including first and second planes defining four substantially equal quadrants on the front and rear surfaces of the eccentric member and a third plane separating the front surface from the rear surface. The oscillating power tool also includes an amplitude adjustment actuator configured to move the eccentric member to change the angular amplitude of oscillating rotation of the forked member. The amplitude adjustment actuator is configured to engage the eccentric member on the front surface and on the rear surface. The amplitude adjustment actuator is configured to engage the eccentric member on both sides of the first plane. The amplitude adjustment actuator is configured to engage the eccentric member on both sides of the second plane.

In another aspect, the disclosure provides an oscillating power tool including a housing, and a motor disposed generally within the housing, the motor including a drive shaft rotatable about a motor axis. The oscillating power tool also includes an output spindle configured to be driven by the motor and journaled for oscillating rotation about an oscillation axis. The oscillating power tool also includes a drive mechanism configured to convert rotation of the drive shaft into oscillating rotation of the output spindle about the oscillation axis, the drive mechanism including an eccentric member configured to rotate off center about the motor axis, and a forked member operatively coupled to the eccentric member and configured for oscillating rotation about the oscillation axis in response to rotation of the eccentric member. Oscillating rotation of the forked member has an angular amplitude about the oscillation axis. The eccentric member is movable with respect to the forked member to change the angular amplitude of oscillating rotation of the forked member. The oscillating power tool also includes an amplitude adjustment actuator configured to move the eccentric member to change the angular amplitude of oscillating rotation of the forked member, the amplitude adjustment actuator defining a receptacle. At least a portion of the forked member is disposed in the receptacle.

In another aspect, the disclosure provides an oscillating power tool including a housing, and a motor disposed generally within the housing, the motor including a drive shaft rotatable about a motor axis. The oscillating power tool also includes an output spindle configured to be driven by the motor and journaled for oscillating rotation about an oscillation axis. The oscillating power tool also includes a drive mechanism configured to convert rotation of the drive shaft into oscillating rotation of the output spindle about the oscillation axis, the drive mechanism including an eccentric member configured to rotate off center about the motor axis, and a forked member operatively coupled to the eccentric member and configured for oscillating rotation about the oscillation axis in response to rotation of the eccentric member. Oscillating rotation of the forked member has an angular amplitude about the oscillation axis. The eccentric member is movable with respect to the forked member to change the angular amplitude of oscillating rotation of the forked member. The oscillating power tool also includes an amplitude adjustment actuator configured to move the eccentric member to change the angular amplitude of oscillating rotation of the forked member. The amplitude adjustment actuator includes a first actuation surface extending through a first aperture in the housing, and the amplitude adjustment actuator includes a second actuation surface extending through a second aperture in the housing separate from the first aperture.

Other aspects of the invention will become apparent by consideration of the detailed description and accompanying drawings.

DETAILED DESCRIPTION

Before any implementations of the disclosure are explained in detail, it is to be understood that the disclosure is not limited in its application to the details of implementation and the arrangement of components set forth in the following description or illustrated in the following drawings. The disclosure is capable of other implementations and of being practiced or of being carried out in various ways. Also, it should be understood that the phraseology and terminology used herein are for the purpose of description and should not be regarded as limiting.

FIGS. 1-9 illustrate a power tool 10 according to one implementation of the invention. The power tool 10 includes a main body 12 having a housing 14 defining a handle 16 and a head 18. The head 18 is driven by a motor 20 (FIG. 2) disposed within the housing 14. The handle 16 includes a grip portion 22 providing a surface suitable for grasping by an operator to operate the power tool 10. The housing 14 generally encloses the motor 20. The term "generally" is used herein to mean at least mostly, but not necessarily exactly or completely.

The motor 20 in the illustrated implementation is an electric motor driven by a power source such as a battery pack 24 (FIG. 1), but may be powered by other power sources such as an AC power cord in other implementations. In yet other implementations, the power tool 10 may be pneumatically powered or powered by any other suitable power source and the motor 20 may be a pneumatic motor or other suitable type of motor. The motor 20 includes a motor drive shaft 26 (FIGS. 2-3) extending therefrom and driven for rotation about a motor axis A. The motor 20 may be a variable speed or multi-speed motor. In other implementations, other suitable motors may be employed.

The battery pack 24 (FIG. 1) is a removable and rechargeable battery pack. In the illustrated implementation, the battery pack 24 may include a 12-volt battery pack, a 14.4-volt battery pack, an 18-volt battery pack, or any other suitable voltage, and includes Lithium-ion battery cells (not shown). Additionally or alternatively, the battery cells may have chemistries other than Lithium-ion such as, for example, Nickel Cadmium, Nickel Metal-Hydride, or the like. In other implementations, other suitable batteries and battery packs may be employed.

Figure 1:
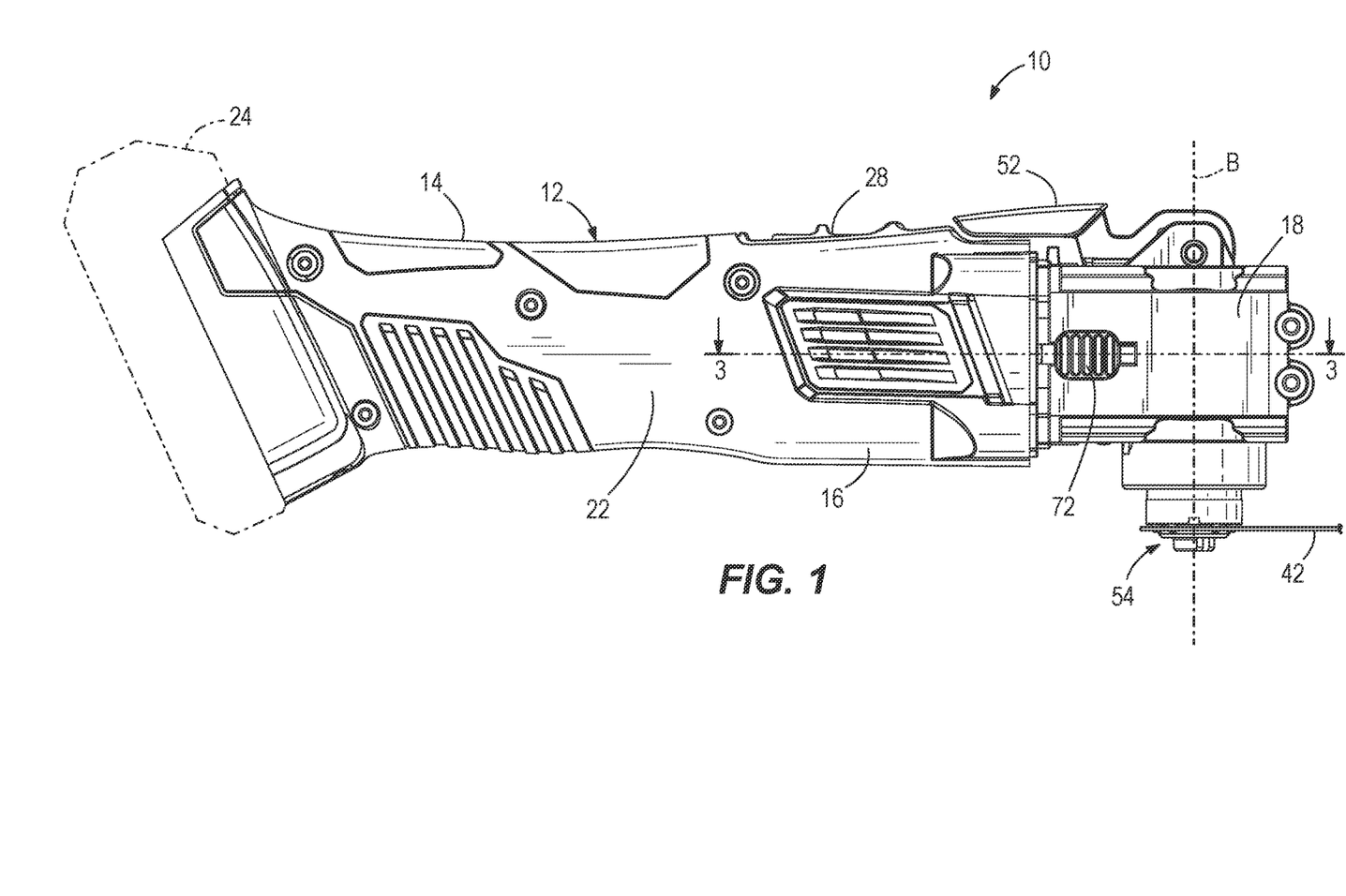
FIG. 1 is a side view of a power tool having an amplitude adjustment actuator according to one implementation of the invention.

The main body 12 also includes a power actuator 28 (FIG. 1). The power actuator 28 is movably coupled with the housing 14 and is actuatable to power the motor 20, e.g., to electrically couple the battery pack 24 and the motor 20 to run the motor 20. The power actuator 28 may be a sliding actuator as shown, or in other implementations may include a trigger-style actuator, a button, a lever, a knob, etc.

Figure 2:
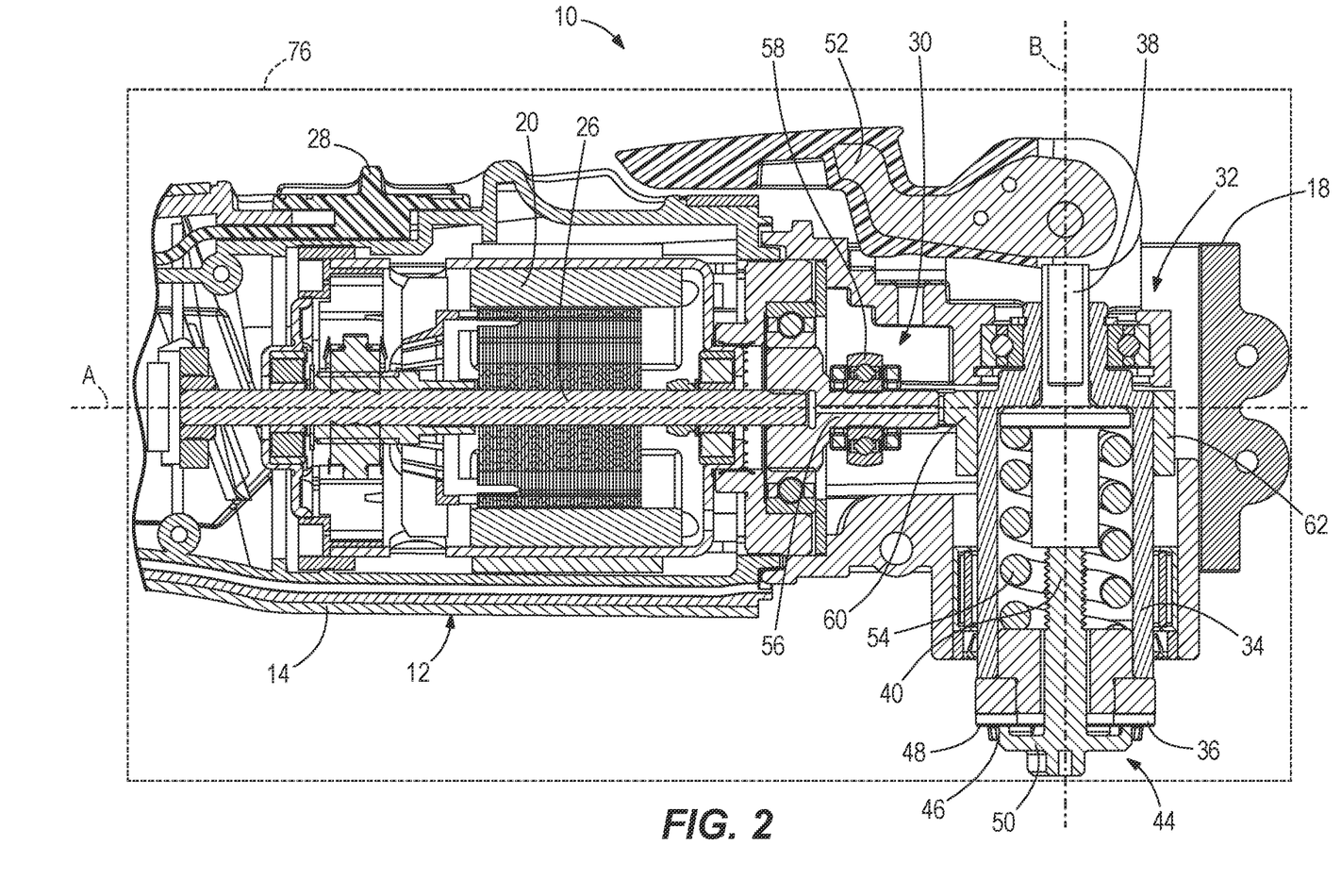
FIG. 2 is a side view cross section of a portion of the power tool of FIG. 1.
Figure 3:
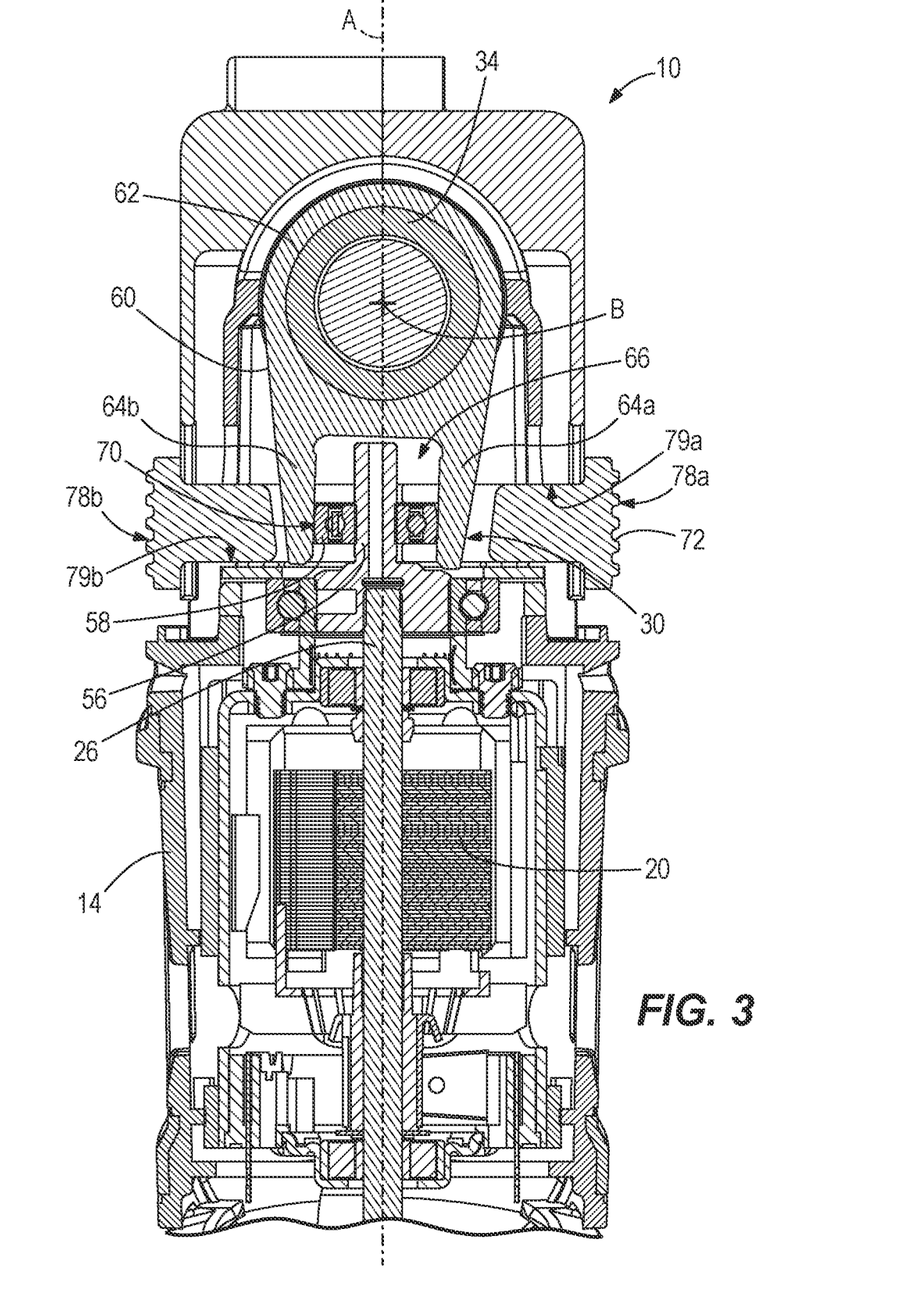
FIG. 3 is a cross section of the power tool shown in FIG. 1 taken through line 3-3 in FIG. 1, the power tool having an adjustable drive mechanism.

The housing 14 also houses a drive mechanism 30 (FIGS. 2-3) for converting rotary motion of the motor drive shaft 26 into oscillating motion of an output mechanism 32. As shown in FIG. 2, the output mechanism 32 includes a spindle 34 having an accessory holder 36 disposed at a distal end thereof, and a plunger 38 and a threaded clamping shaft 40 disposed within the spindle 34, which is hollow in the illustrated implementation. As shown in FIG. 2, the spindle 34 terminates, at a free end, with the accessory holder 36. The accessory holder 36 is configured to receive an accessory 42 (FIG. 1) such as a blade, and a clamping mechanism 44 (FIG. 2) clamps the accessory 42 to the accessory holder 36. Specifically, the accessory holder 36 includes a first locating feature 46, such as a protrusion or protrusions protruding from a face 48 of the accessory holder 36, sized and shaped for receiving the accessory 42 having a second locating feature (not shown) such as an opening configured to mate with the first locating feature 46. The threaded clamping shaft 40 includes a clamping flange 50 at a distal end thereof for clamping the accessory 42 to the accessory holder 36 for oscillating motion with the spindle 34. An operator may thread the threaded clamping shaft 40 into the plunger 38 to hand tighten the clamping flange 50 against the accessory 42. A clamping actuator 52, such as a lever, is configured to apply and release a clamping force from a biasing member 54, such as a spring. In a first position of the clamping actuator 52 (FIG. 2), the biasing member 54 applies the clamping force pulling the clamping flange 50 towards the accessory holder 36 to clamp the accessory 42 tightly. In a second position (not shown) of the clamping actuator 52, the plunger 38 compresses the biasing member 54 to remove the clamping force from the accessory holder 36 such that the threaded clamping shaft 40 can be unthreaded and removed to release the accessory 42. The spindle 34 defines an oscillation axis B substantially perpendicular to the motor axis A about which the spindle 34 oscillates, as will be described in greater detail below. In other implementations, other clamping actuators may be employed, such as a button, a knob, etc.

As shown in FIG. 2, the drive mechanism 30 includes an eccentric shaft 56 coupled to the motor drive shaft 26 and offset (e.g., off center) from the motor axis A, an eccentric bearing 58 coupled to the eccentric shaft 56, and a forked yoke 60. In some implementations, the eccentric shaft 56 and the eccentric bearing 58 may be formed as one piece. The term "an eccentric member" as used herein may refer to the eccentric shaft 56 and/or the eccentric bearing 58. The forked yoke 60 is coupled fixedly to the spindle 34 by way of a sleeve portion 62, and the forked yoke 60 and spindle 34 are collectively mounted for oscillating rotation about the oscillation axis B. The forked yoke 60 does not slide or move with respect to the housing 14 other than to oscillate in a rotating fashion about the oscillation axis B.

The forked yoke 60 also includes two arms 64a, 64b (FIG. 3) extending from the sleeve portion 62 and defining a recess 66 therebetween. The arms 64a, 64b are disposed adjacent generally opposite sides of the eccentric bearing 58, which is disposed in the recess 66. Each arm 64a, 64b engages an outer circumferential surface 70 of the eccentric bearing 58. As the eccentric bearing 58 rotates off center about the motor axis A, the eccentric bearing 58 pushes each arm 64a, 64b in an alternating fashion to cause the forked yoke 60 to oscillate. Thus, the forked yoke 60 oscillates about the oscillation axis B to convert the eccentric rotary motion of the eccentric bearing 58 about the motor axis A into oscillating motion of the spindle 34 and the accessory holder 36 about the oscillation axis B.

Figure 4:
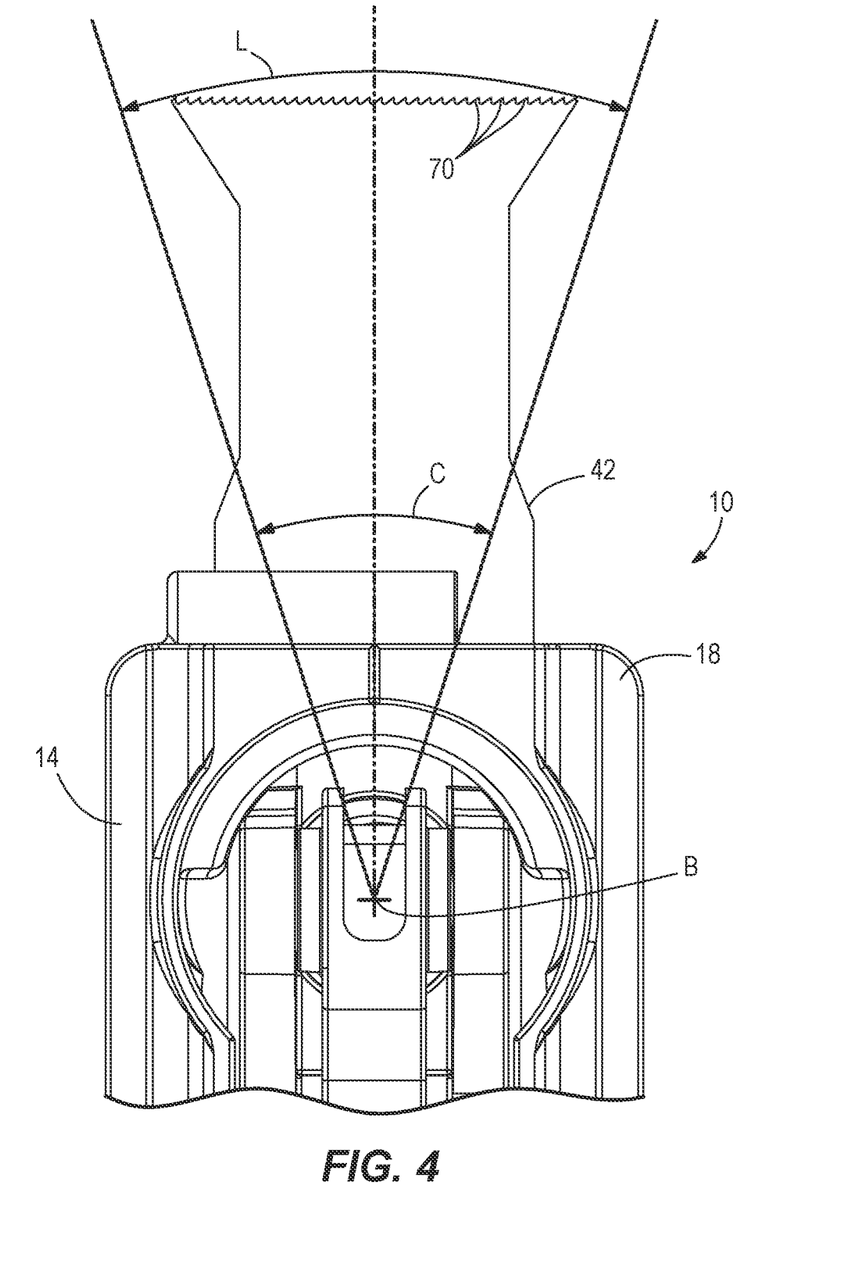
FIG. 4 is a top view of a portion of the power tool of FIG. 1.

FIG. 4 illustrates an angular amplitude of oscillation C of the spindle 34 about the oscillation axis B. Depending on the type of accessory 42 attached, the angular amplitude of oscillation C corresponds to a stroke length L of the accessory 42. As illustrated in FIG. 4, the accessory 42 may include a blade having a distal working end with teeth 70. The stroke length L is defined by the total arc length of the path of the working end (e.g., of the teeth 70) of the accessory 42 during oscillation about the axis B.

Figure 5:
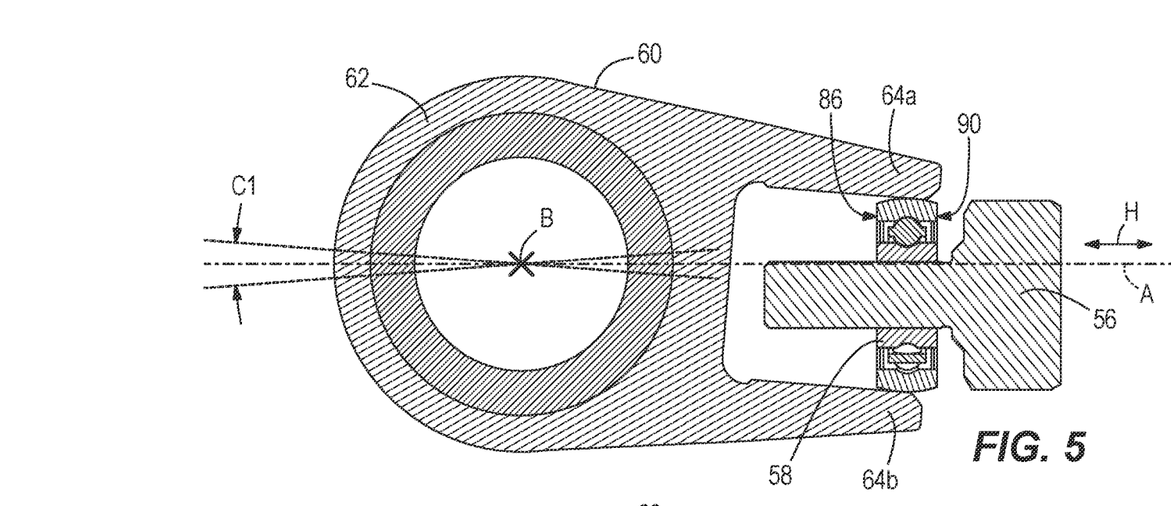
FIG. 5 is an enlarged view of a portion of the adjustable drive mechanism of FIG. 3 in a first position.
Figure 6:
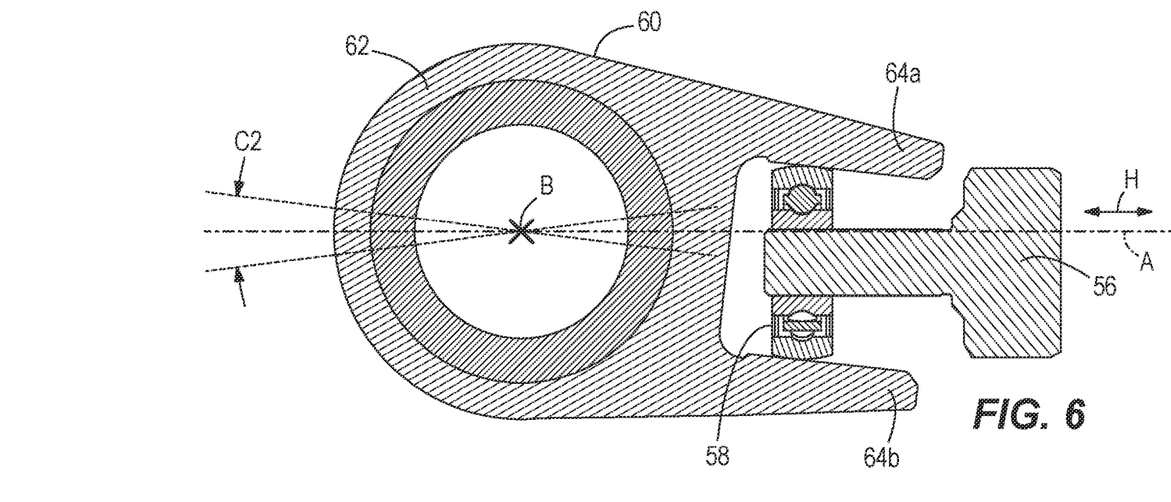
FIG. 6 is an enlarged view of the portion of the adjustable drive mechanism of FIG. 3 in a second position.

As illustrated schematically in FIGS. 5-6, the angular amplitude of oscillation C is adjustable. As described above, the forked yoke 60 is fixed with respect to the housing 14 other than to rotatably oscillate about the oscillation axis B. The eccentric bearing 58 is movable with respect to the forked yoke 60 (and with respect to the housing 14) in a horizontal direction H generally parallel to the motor axis A, towards (FIG. 6) and away from (FIG. 5) the oscillation axis B as shown. In other words, the eccentric bearing 58 is movable within the recess 66, towards and away from the sleeve portion 62 of the forked yoke 60. Adjustment of the eccentric bearing 58 changes the angular amplitude of oscillation C from a first angular amplitude of oscillation C1 associated with a first position (FIG. 5) of the eccentric bearing 58 to a second angular amplitude of oscillation C2 associated with a second position (FIG. 6) of the eccentric bearing 58. For example, the first angular amplitude of oscillation C1 may be about 3.4 degrees (e.g., +/−0.5 degrees) and the second angular amplitude of oscillation C2 may be about 5.0 degrees (e.g., +/−0.5 degrees). In some implementations, the first angular amplitude of oscillation C1 is 3.4 degrees and the second angular amplitude of oscillation C2 is 5.0 degrees. In other implementations, other suitable angles may be employed. For example, the first angle C1 may be greater than 0 degrees and less than 5 degrees, and the second angle C2 may be greater than or equal to 1 degree and less than 10 degrees. The second angular amplitude of oscillation C2 is greater than the first angular amplitude of oscillation C1. As the eccentric bearing 58 gets closer to the oscillation axis B, the angular amplitude of oscillation C increases. Conversely, as the eccentric bearing 58 gets farther away from the oscillation axis B, the angular amplitude of oscillation C decreases.

The first position (FIG. 5) of the eccentric bearing 58 may be a minimum and the second position (FIG. 6) of the eccentric bearing 58 may be a maximum such that the output (i.e., the angular amplitude of oscillation C) is adjustable between the first angular amplitude of oscillation C1 and the second angular amplitude of oscillation C2. In other words, the first and second positions may be extremes, and the eccentric bearing 58 is infinitely adjustable between extremes. The output may be infinitely adjustable between the first and second angles of oscillation C1, C2. For example, the eccentric bearing 58 may be infinitely adjustable between the first and second positions such that the angular amplitude of oscillation C is infinitely adjustable between (and including) the first and second angles of oscillation C1, C2. In this example, the eccentric bearing 58 may be fitted onto the eccentric shaft 56 slidably, employing a friction fit defined as tight enough such that the friction between the eccentric bearing 58 and the eccentric shaft 56 is sufficient to hold the eccentric bearing 58 in place on the eccentric shaft 56 in any position (i.e., a desired position) from the first position to the second position. However, there is enough give to allow movement of the eccentric bearing 58 on the eccentric shaft 56 in response to application of a manual force by the operator, as will be described in greater detail below. In other implementations, the eccentric bearing 58 and the eccentric shaft 56 may be movable as a unit in the horizontal direction H.

Figure 7:
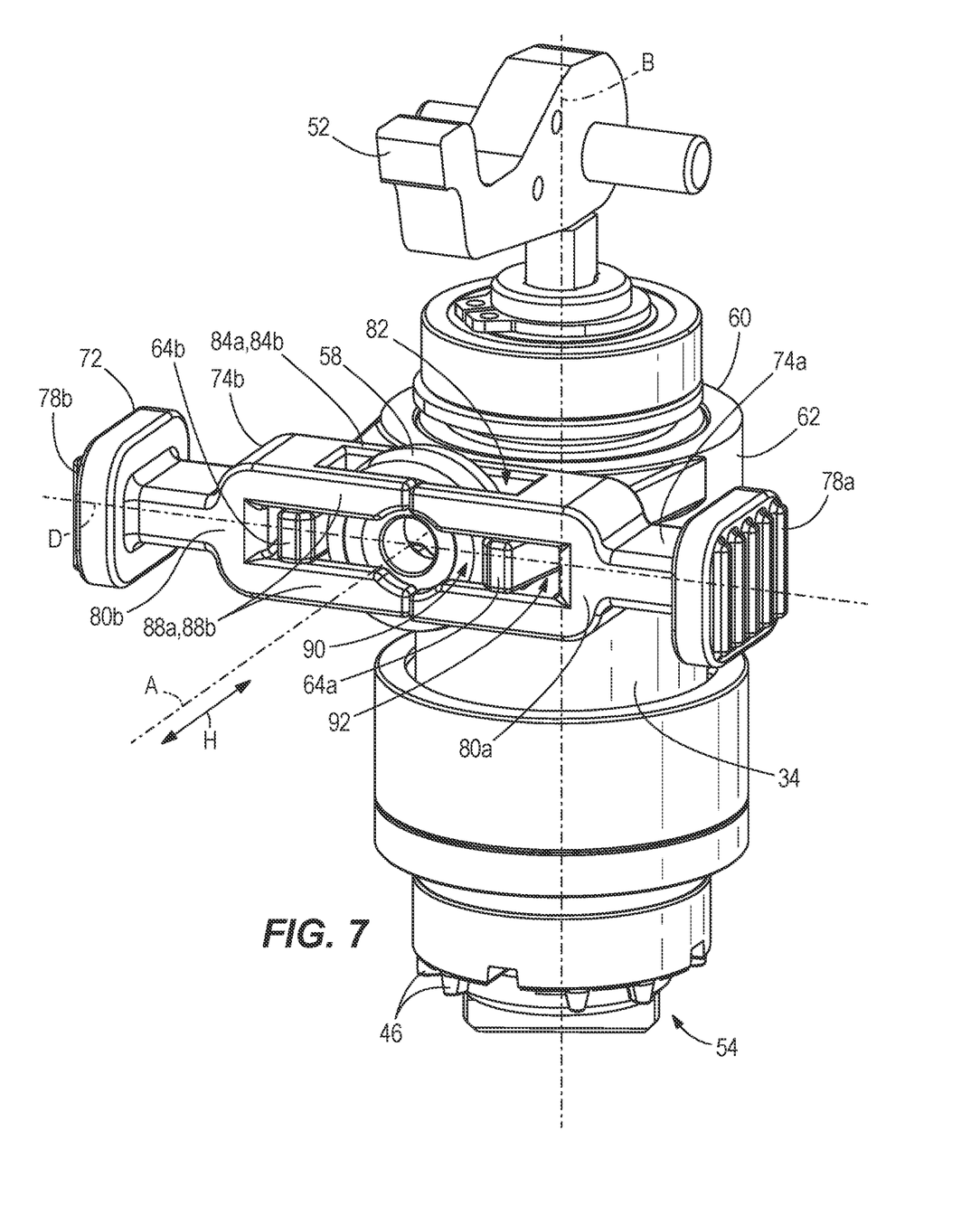
FIG. 7 is a rear perspective view of the adjustable drive mechanism and an output mechanism of the power tool of FIG. 1 with the housing removed.

With reference to FIG. 7, the power tool 10 also includes an amplitude adjustment actuator 72 (which may also be referred to as an angle adjustment actuator) operable by the operator to change the angular amplitude of oscillation C. The amplitude adjustment actuator 72 includes a first actuator portion 74a and a second actuator portion 74b, though the first and second actuator portions 74a, 74b may be formed as a single piece in other implementations. The first and second actuator portions 74a, 74b are symmetrically disposed on opposite sides of a plane 76 (FIG. 2) defined as including the motor axis A and being parallel to the oscillation axis B. Each of the first and second actuator portions 74a, 74b includes an actuation surface 78a, 78b external to the housing 14 for engagement by an operator's hand to apply manual force to move the actuation surface 78a, 78b with respect to the housing 14. The first actuation surface 78a extends through a first aperture 79a (FIG. 3) in the housing 14 and the second actuation surface 78b extends through a second aperture 79b in the housing 14. The first and second actuation surfaces 78a, 78b are disposed on opposite sides of the housing 14, e.g., on opposite sides of the plane 76, which divides the housing 14 into two substantially equal portions. An axis D extends from the first actuation surface 78a to the second actuation surface 78b surface in a direction generally perpendicular to both the oscillation axis B and the motor axis A. The amplitude adjustment actuator 72 may be generally elongated in the direction of the axis D.

Each of the first and second actuator portions 74a, 74b also includes a bearing fork 80a, 80b for receiving the eccentric bearing 58. The bearing forks 80a, 80b define a receptacle 82 for receiving the eccentric bearing 58. Each bearing fork 80a, 80b includes front bearing fork arms 84a, 84b disposed adjacent a front surface 86 (FIG. 5) of the eccentric bearing 58 and rear bearing fork arms 88a, 88b disposed adjacent a rear surface 90 of the eccentric bearing 58. The front surface 86 of the eccentric bearing 58 is disposed closer to the sleeve portion 62 in the horizontal direction H than the rear surface 90, and the rear surface 90 is generally opposite the front surface 86 and farther from the sleeve portion 62 in the horizontal direction H than the front surface 86. The receptacle 82 is disposed between the front and rear bearing fork arms 84a, 84b, 88a, 88b. The bearing forks 80a, 80b also define a side aperture 92 in communication with the receptacle 82 for receiving the forked yoke arms 64a, 64b and the eccentric shaft 56 in the receptacle 82.

Figure 8:
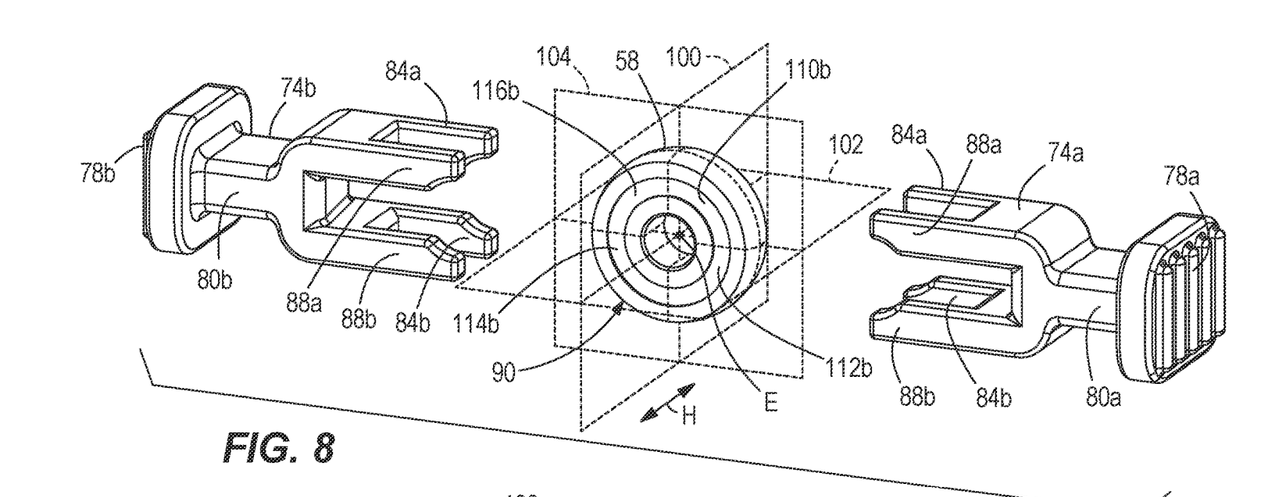
FIG. 8 is a rear perspective view of an exploded portion of the adjustable drive mechanism of FIG. 7.
Figure 9:
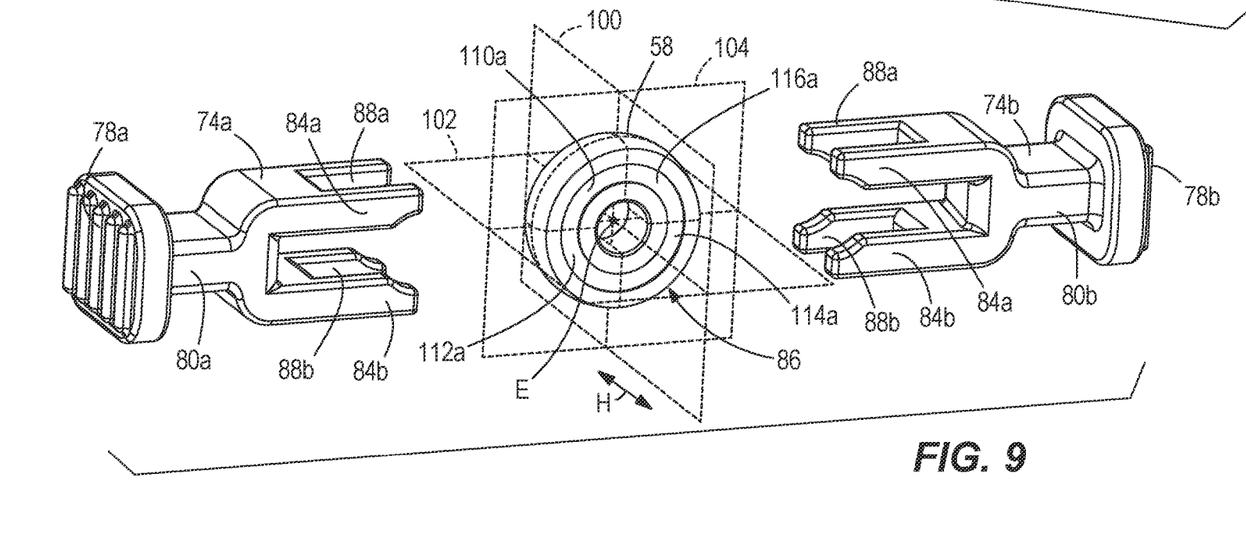
FIG. 9 is a front perspective view of the exploded portion of the adjustable drive mechanism shown in FIG. 8.

FIGS. 8-9 are rear and front exploded views of the eccentric bearing 58 and the amplitude adjustment actuator 72, showing more detail. A set of three orthogonal reference planes intersect each other at a geometric center E of the eccentric member 58. The set of three orthogonal reference planes includes a first plane 100 and a second plane 102 together defining four substantially equal quadrants 110a, 112a, 114a, 116a (FIG. 9) on the front surface 86 and four substantially equal corresponding quadrants 110b, 112b, 114b, 116b (FIG. 8) on the rear surface 90 of the eccentric member 58. The set of three orthogonal reference planes also includes a third plane 104 separating the front surface 86 from the rear surface 90. The amplitude adjustment actuator 72 may engage the eccentric member 58 on the front surface 86 and on the rear surface 90. The amplitude adjustment actuator 72 may also engage the eccentric member 58 on both sides of the first plane 100 and on both sides of the second plane 102 on the front surface 86 and/or on the rear surface 90. For example, the first actuator portion 74a may engage the eccentric bearing 58 on a first side 120 of the first plane 100 and the second actuator portion 74b may engage the eccentric bearing 58 on a second side 130 of the first plane 100. The bearing fork 80a of the first actuator portion 74a may engage both sides of the second plane 102 and both the front and rear surfaces 86, 90. The bearing fork 80b of the second actuator portion 74b may engage both sides of the second plane 102 and both the front and rear surfaces 86, 90. Thus, the eccentric bearing 58 is symmetrically engaged, and thus evenly pushed, by the amplitude adjustment actuator 72. Even engagement provides a balanced force for moving the eccentric bearing 58 to facilitate smooth movement. For example, even engagement reduces the chance of a torque being applied causing the eccentric bearing 58 to bite or stick during application of the force.

The amplitude adjustment actuator 72 is slidable parallel to the axis A (in the horizontal direction H) to adjust the horizontal position of the eccentric bearing 58 with respect to the forked yoke 60. During adjustment, the amplitude adjustment actuator 72 engages the rear surface 90 or front surface 86 of the eccentric bearing 58 to move the eccentric member 58 in the horizontal direction H closer to or farther from the sleeve portion 62 of the forked yoke 60, respectively. As shown from FIGS. 5 to 6, this adjustment changes the angular amplitude of oscillation C within a range of angles from C1 to C2, inclusive thereof. Thus, the amplitude adjustment actuator 72 and the eccentric bearing 58 are infinitely adjustable between the first position (FIG. 5) and the second position (FIG. 6). The friction keeping the eccentric bearing 58 in place (as described above) may be enough to keep the amplitude adjustment actuator 72 in the desired position. In other implementations, the amplitude adjustment actuator 72 may have a frictional engagement with a portion of the power tool 10, such as the housing 14, in order to hold the amplitude adjustment actuator 72 and in turn the eccentric bearing 58 in the desired position. In some implementations, both the eccentric bearing 58 and the amplitude adjustment actuator 72 have frictional engagements.

In operation, the operator actuates the amplitude adjustment actuator 72 by manually engaging and pushing one or both of the actuation surfaces 78a, 78b in the horizontal direction H to select a desired angular amplitude of oscillation C between (and including) the first angular amplitude of oscillation C1 and the second angular amplitude of oscillation C2. Moving the amplitude adjustment actuator 72 closer to the oscillation axis B increases the angular amplitude of oscillation C and moving the amplitude adjustment actuator 72 farther away from the oscillation axis B decreases the angular amplitude of oscillation C. The operator actuates the power actuator 28 to engage the motor 20, to oscillate the accessory 42 at the desired angular amplitude of oscillation C, and perform a cut or other operation. In some implementations, the operator may move the amplitude adjustment actuator 72 while the motor 20 is running and not running to change the angular amplitude of oscillation C during operation. In other implementations, the amplitude adjustment actuator 72 may be locked while the motor is running such that the operator can only move the amplitude adjustment actuator 72 when the motor 20 is not running.

Thus, the invention provides a power tool having an angle adjustment mechanism for infinitely adjusting the angular amplitude of oscillation C of the accessory holder 36 between a minimum angle C1 and a maximum angle C2.

Although the invention has been described in detail with reference to certain preferred implementations, variations and modifications exist within the scope and spirit of one or more independent aspects of the disclosure as described.

What is claimed is:

1. An oscillating power tool comprising:
a housing;
a motor disposed generally within the housing, the motor including a drive shaft rotatable about a motor axis;
an output spindle configured to be driven by the motor and journaled for oscillating rotation about an oscillation axis;
a drive mechanism configured to convert rotation of the drive shaft into oscillating rotation of the output spindle about the oscillation axis, the drive mechanism including an eccentric member configured to rotate off center about the motor axis, and a forked member operatively coupled to the eccentric member and configured for oscillating rotation about the oscillation axis in response to rotation of the eccentric member,
  wherein oscillating rotation of the forked member has an angular amplitude about the oscillation axis, wherein the eccentric member is movable in a direction generally parallel to the motor axis to change the angular amplitude of oscillating rotation of the forked member, wherein the eccentric member includes a front surface and a rear surface opposite the front surface, wherein the front surface is closer to the output spindle than the rear surface, wherein the rear surface is closer to the motor than the front surface, wherein a set of three orthogonal reference planes intersect each other at a geometric center of the eccentric member, the set of three orthogonal reference planes including first and second planes defining four substantially equal quadrants on the front and rear surfaces of the eccentric member and a third plane separating the front surface from the rear surface; and
an amplitude adjustment actuator configured to move the eccentric member in the direction generally parallel to the motor axis to change the angular amplitude of oscillating rotation of the forked member, wherein the amplitude adjustment actuator is configured to engage the eccentric member on the front surface and on the rear surface, wherein the amplitude adjustment actuator is configured to engage the eccentric member on both sides of the first plane, wherein the amplitude adjustment actuator is configured to engage the eccentric member on both sides of the second plane, wherein the amplitude adjustment actuator comprises a first actuator portion configured to engage the eccentric member on a first side of the first plane and a second actuator portion configured to engage the eccentric member on a second side of the first plane, wherein the first and second actuator portions are formed as separate pieces, and wherein the first portion includes a first actuation surface extending through a first aperture in the housing and the second portion includes a second actuation surface extending through a second aperture in the housing.

2. The oscillating power tool of claim 1, wherein the amplitude adjustment actuator defines a receptacle, wherein at least a portion of the forked member is disposed in the receptacle.

3. The oscillating power tool of claim 2, wherein at least a portion of the eccentric member is further disposed in the receptacle.

4. The oscillating power tool of claim 1, wherein the eccentric member is infinitely adjustable between extremes such that the angular amplitude of oscillating rotation of the forked member is infinitely adjustable between lower and upper limits.

5. The oscillating power tool of claim 1, wherein the angular amplitude of oscillating rotation is adjustable from about 3.4 degrees to about 5 degrees.

6. An oscillating power tool comprising:
a housing;
a motor disposed generally within the housing, the motor including a drive shaft rotatable about a motor axis;
an output spindle configured to be driven by the motor and journaled for oscillating rotation about an oscillation axis;
a drive mechanism configured to convert rotation of the drive shaft into oscillating rotation of the output spindle about the oscillation axis, the drive mechanism including an eccentric member configured to rotate off center about the motor axis, and a forked member operatively coupled to the eccentric member and configured for oscillating rotation about the oscillation axis in response to rotation of the eccentric member, wherein oscillating rotation of the forked member has an angular amplitude about the oscillation axis, wherein the eccentric member is movable in a direction generally parallel to the motor axis to change the angular amplitude of oscillating rotation of the forked member; and
an amplitude adjustment actuator configured to move the eccentric member in the direction generally parallel to the motor axis to change the angular amplitude of oscillating rotation of the forked member, the amplitude adjustment actuator defining a receptacle, wherein at least a portion of the forked member is disposed in the receptacle and wherein the amplitude adjustment actuator comprises a first actuator portion configured to engage the eccentric member on a first side of the first plane and a second actuator portion configured to engage the eccentric member on a second side of the first plane, wherein the first and second actuator portions are formed as separate pieces, and wherein the first portion includes a first actuation surface extending through a first aperture in the housing and the second portion includes a second actuation surface extending through a second aperture in the housing.

7. The oscillating power tool of claim 6, wherein at least a portion of the eccentric member is further disposed in the receptacle.

8. The oscillating power tool of claim 6, wherein the amplitude adjustment actuator includes a first aperture open to a first side of the amplitude adjustment actuator and a second aperture open to a second side of the amplitude adjustment actuator, wherein the first aperture and the second aperture are in communication with the receptacle.

9. The oscillating power tool of claim 8, wherein a first open face of the first aperture is disposed generally perpendicular to the oscillation axis for receiving at least a portion of the eccentric member and wherein a second open face of the second aperture is disposed generally perpendicular to the motor axis for receiving the at least a portion of the forked member.

10. The oscillating power tool of claim 6, the amplitude adjustment actuator further comprising at least two fork arms configured to engage the eccentric member and defining walls of the receptacle.

11. The oscillating power tool of claim 6, the amplitude adjustment actuator further comprising:
a first actuator portion having at least two first fork arms configured to engage the eccentric member, the at least two first fork arms at least partially defining the receptacle, and
a second actuator portion having at least two second fork arms configured to engage the eccentric member, the at least two second fork arms at least partially defining the receptacle.

12. An oscillating power tool comprising:
a housing;
a motor disposed generally within the housing, the motor including a drive shaft rotatable about a motor axis;
an output spindle configured to be driven by the motor and journaled for oscillating rotation about an oscillation axis;
a drive mechanism configured to convert rotation of the drive shaft into oscillating rotation of the output spindle about the oscillation axis, the drive mechanism including an eccentric member configured to rotate off center about the motor axis, and a forked member operatively coupled to the eccentric member and configured for oscillating rotation about the oscillation axis in response to rotation of the eccentric member, wherein oscillating rotation of the forked member has an angular amplitude about the oscillation axis, wherein the eccentric member is movable with respect to the forked member to change the angular amplitude of oscillating rotation of the forked member; and
an amplitude adjustment actuator configured to move the eccentric member to change the angular amplitude of oscillating rotation of the forked member, wherein the amplitude adjustment actuator includes a first actuation surface extending through a first aperture in the housing, and wherein the amplitude adjustment actuator includes a second actuation surface extending through a second aperture in the housing separate from the first aperture.

13. The oscillating power tool of claim 12, wherein the first and second actuation surfaces are disposed on opposite sides of the housing.

14. The oscillating power tool of claim 12, wherein a reference axis extends from the first actuation surface to the second actuation surface in a direction generally perpendicular to both the oscillation axis and the motor axis.

15. The oscillating power tool of claim 12, wherein the amplitude adjustment actuator defines a receptacle, wherein at least a portion of the eccentric member and at least a portion of the forked member are disposed in the receptacle.

16. The oscillating power tool of claim 12, the amplitude adjustment actuator further comprising at least three fork arms configured to engage the eccentric member.

17. The oscillating power tool of claim 12, the amplitude adjustment actuator further comprising a first actuator portion having at least two first fork arms configured to engage the eccentric member and a second actuator portion having at least two second fork arms configured to engage the eccentric member.

18. The oscillating power tool of claim 17, wherein the first actuator portion includes four first fork arms configured to engage the eccentric member and the second actuator portion includes four second fork arms configured to engage the eccentric member.

* * * * *